United States Patent [19]

Lalonde

[11] 4,174,669
[45] Nov. 20, 1979

[54] VEHICLE TRAY AND MOUNTING BRACKET ASSEMBLY

[76] Inventor: A. Roger Lalonde, Box 577, Chelmesford, Ontario, Canada, P0M 1L0

[21] Appl. No.: 880,041

[22] Filed: Feb. 22, 1978

[51] Int. Cl.² .............................................. A47B 23/00
[52] U.S. Cl. ........................................ 108/44; 108/45
[58] Field of Search ................. 108/42, 44, 28, 45, 108/46, 152

[56] References Cited

U.S. PATENT DOCUMENTS

| | | | |
|---|---|---|---|
| 131,241 | 9/1872 | Arnold | 108/42 UX |
| 1,925,523 | 9/1933 | Cuff et al. | 108/45 UX |
| 2,526,322 | 10/1950 | Black | 108/45 |
| 2,584,557 | 2/1952 | Cuthbertson | 108/45 |
| 2,635,680 | 4/1953 | Zentmire | 108/45 X |
| 2,681,689 | 6/1954 | Breed | 108/44 |
| 2,897,974 | 8/1959 | Cook | 108/44 UX |
| 3,207,567 | 9/1965 | Brady | 108/44 X |
| 3,865,431 | 2/1975 | Zakhi | 108/44 |
| 3,899,982 | 8/1975 | Fetzek | 108/45 |

Primary Examiner—Roy D. Frazier
Assistant Examiner—Peter A. Aschenbrenner

[57] ABSTRACT

The assembly of a vehicle tray and a mounting bracket with the latter either adapted to be mounted over the dash or adapted to be mounted on the floor of an automobile or truck. The tray is readily separable from the mounting bracket to be stowed elsewhere in the vehicle, the mounting bracket of the "over the dash" type is readily adjustable and installable without tools on dashes of different fore and aft depth and the mounting bracket of the "on the floor" type is readily collapsible with the tray removed therefrom for a minimum of encumbrance on the floor of the vehicle. The mounting bracket in either embodiment is of L-shape configuration including a horizontally extending arm, a vertically extending arm, and an upstanding pin readily engaging in an upright hole forming a socket in the tray. The horizontal arm for the dash bracket is of adjustable length and longitudinally extends fore and aft over the dash while the vertical arm of the floor bracket is readily collapsible into a groove in the top of the corresponding horizontal arm.

4 Claims, 12 Drawing Figures

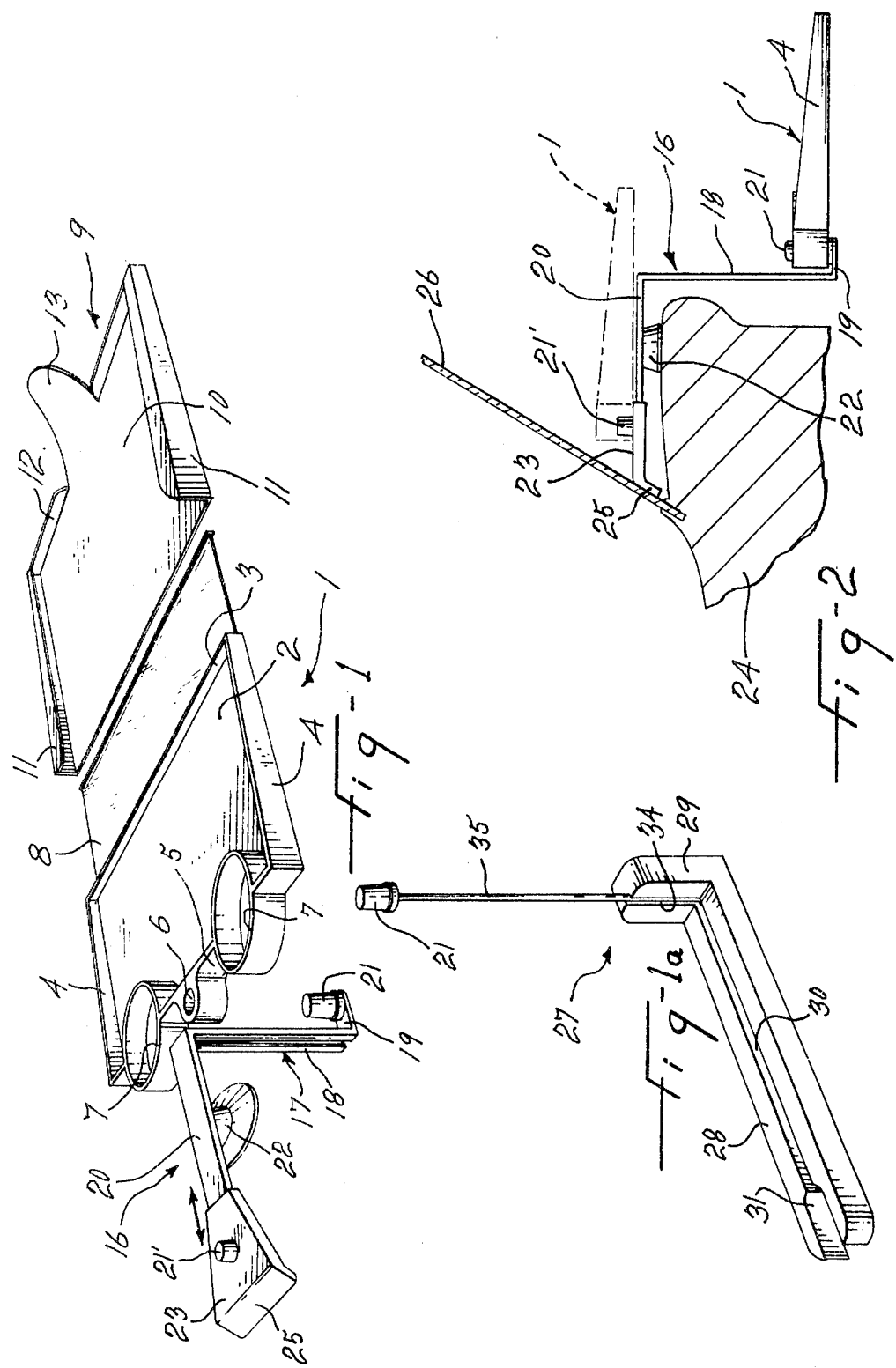

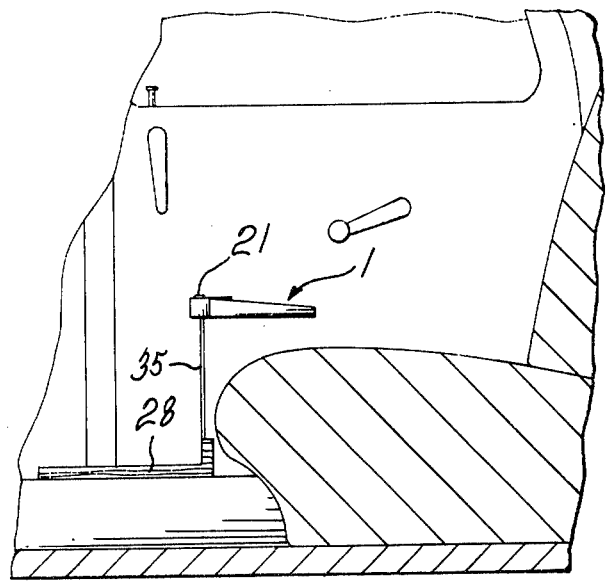
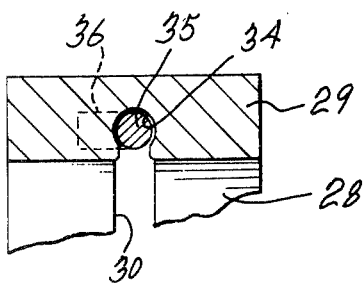
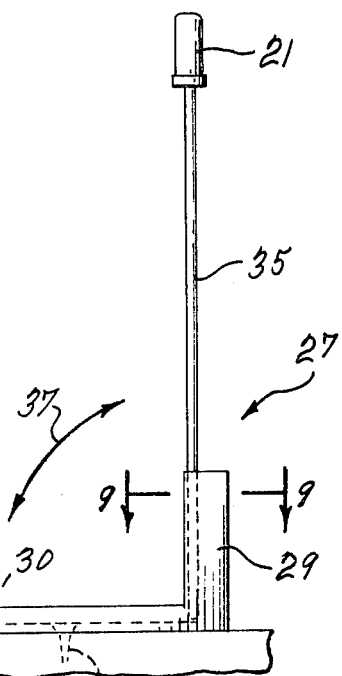
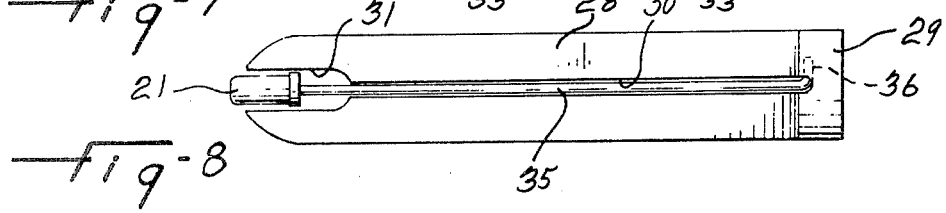

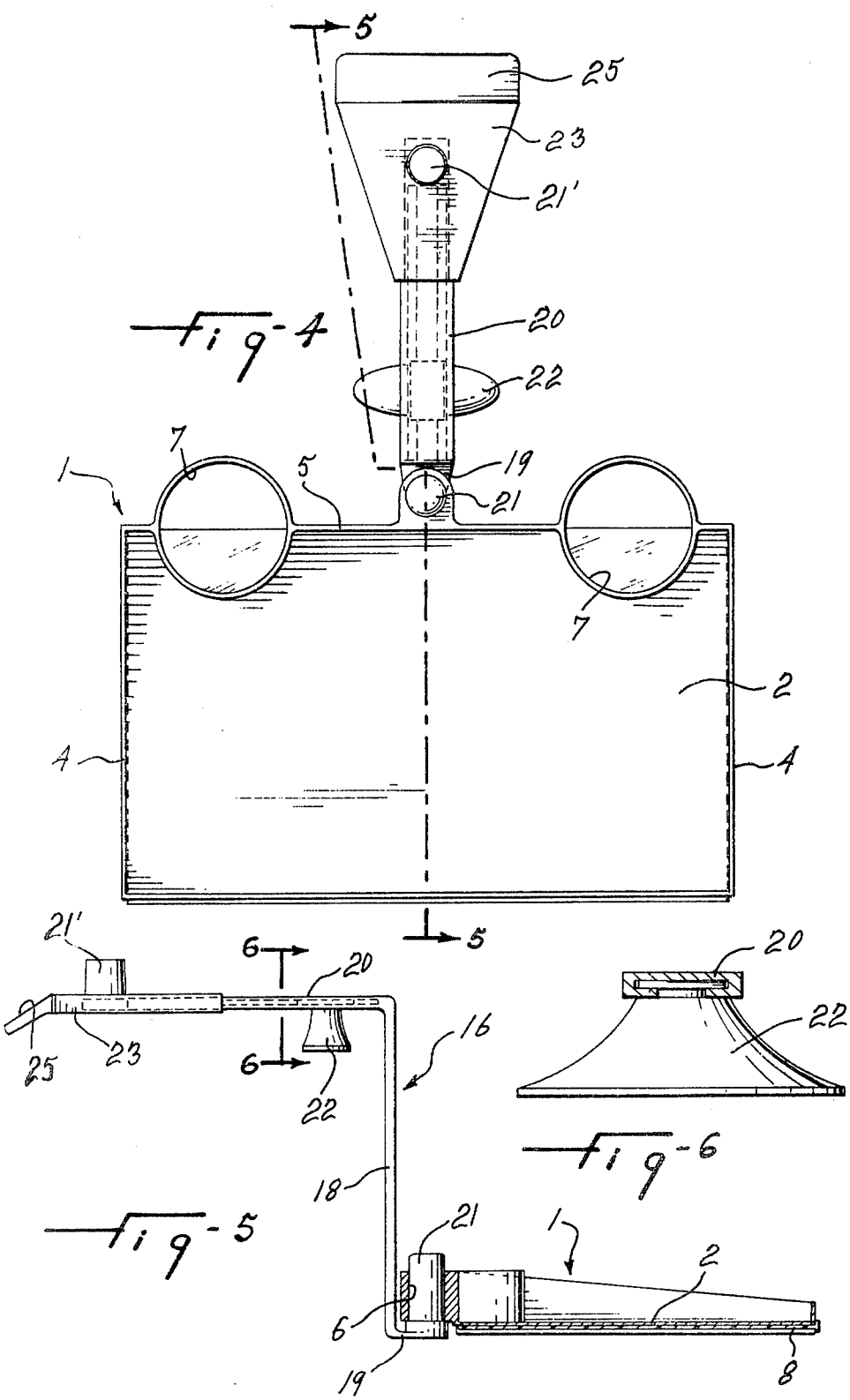

VEHICLE TRAY AND MOUNTING BRACKET ASSEMBLY

FIELD OF THE INVENTION

This invention relates to a tray and bracket assembly of the type particularly adapted to be mounted in a vehicle, such as an automobile or truck, for the utility and convenience of the driver and/or the passengers.

DESCRIPTION OF THE PRIOR ART

So far there have been proposed many concepts of tray and bracket assemblies of the above type which were either secured under the dash or on the floor of the vehicle. It is now found disadvantageous to provide any accessory adapted to be mounted under the dash since in many automobiles or trucks this space is already occupied or retained for a radio, cassette player, or CB. The assemblies of the above type which have been proposed for installation on the floor of a vehicle wholly remain on the floor and constitute an encumbrance even if pivotable to a stowed position.

SUMMARY OF THE INVENTION

It is a general object of the present invention to provide a vehicle tray and mounting bracket assembly of the above type which is particularly adapted to be attached over the dash and thus allows for more universal use even in automobiles and trucks already having something attached under the dash.

It is another object of the present invention to provide a vehicle tray and mounting bracket assembly wherein the tray is readily removable and adapted to be stowed away elsewhere within reach in the vehicle.

It is a further object of the present invention to provide a vehicle tray and mounting bracket assembly wherein the tray is adapted for use with a mounting bracket of either the over the dash type or the on the floor type.

It is still another object of the present invention to provide a vehicle tray and mounting bracket assembly wherein the tray is readily separable from the mounting bracket of the floor type and the same bracket is collapsible for minimum encumbrance on the floor of the vehicle.

It is a still further object of the present invention to provide a vehicle tray and mounting bracket assembly of the above type wherein the mounting bracket is of the "over the dash" type and is readily adjustable and installable without tools substantially universally with respect to dashes of different depths in the fore and aft direction.

BRIEF DESCRIPTION OF THE DRAWINGS

The above and other objects and advantages of the present invention will be better understood with reference to the following detailed description of preferred embodiments thereof which are illustrated, by way of example, in the accompanying drawings; in which:

FIG. 1 is a perspective view of a vehicle tray and over the dash mounting bracket assembly according to a first embodiment of the present invention;

FIG. 1a is a perspective view of a floor mounting bracket adapted to be used instead of the bracket of FIG. 1 to constitute a second embodiment of the present invention;

FIG. 2 is a cross-section transversely of a dash and windshield of a vehicle and showing an elevation view of the vehicle tray and mounting bracket assembly of FIG. 1;

FIG. 3 is a cross-sectional view taken longitudinally of an automobile and showing an elevation view of the vehicle tray and mounting bracket assembly according to the second embodiment of the present invention;

FIG. 4 is a top plan view of the tray and bracket assembly of the first embodiment of the present invention;

FIG. 5 is a side elevation and partly sectional view as seen along line 5—5 in FIG. 4;

FIG. 6 is cross-sectional view as seen along line 6—6 in FIG. 5;

FIG. 7 is a side elevation view of the mounting bracket of FIG. 1a;

FIG. 8 is a top plan view of the mounting bracket of FIGS. 1a and 7;

FIG. 9 is a cross-sectional view as seen along line 9—9 in FIG. 7;

DETAILED DESCRIPTION OF PREFERRED EMBODIMENTS

Figure 10:
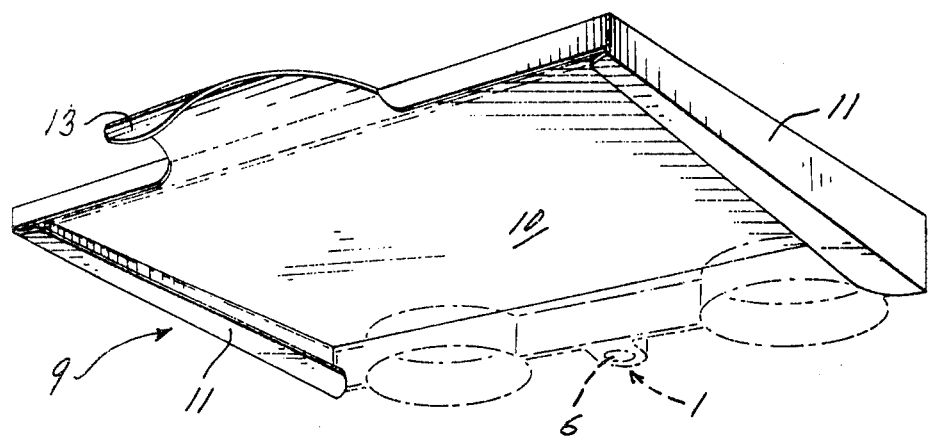
FIG. 10 is a perspective view of a tray holder to stow away the tray.

The present invention includes a vehicle tray 1 which is common to both embodiments illustrated in the drawings. The vehicle tray 1 includes a flat table portion 2 and a peripheral ridge defining a front ridge portion 3, opposite lateral ridge portions 4, and a rear ridge portion 5. The rear ridge portion 5 forms an upwardly extending hole 6 and a pair of depressions 7. The hole 6 is positioned intermediate the ends of the rear ridge portion 5 and forms a socket for connection of the tray onto a pin of a supporting bracket. The depressions 7 form recesses for holding glasses and/or cups, not shown. The opposite lateral ridge portions 4,4 are formed each with an inwardly extending flange arranged below the table or plate 2 to slidably hold a slidable extension plate 8.

Figure 11:
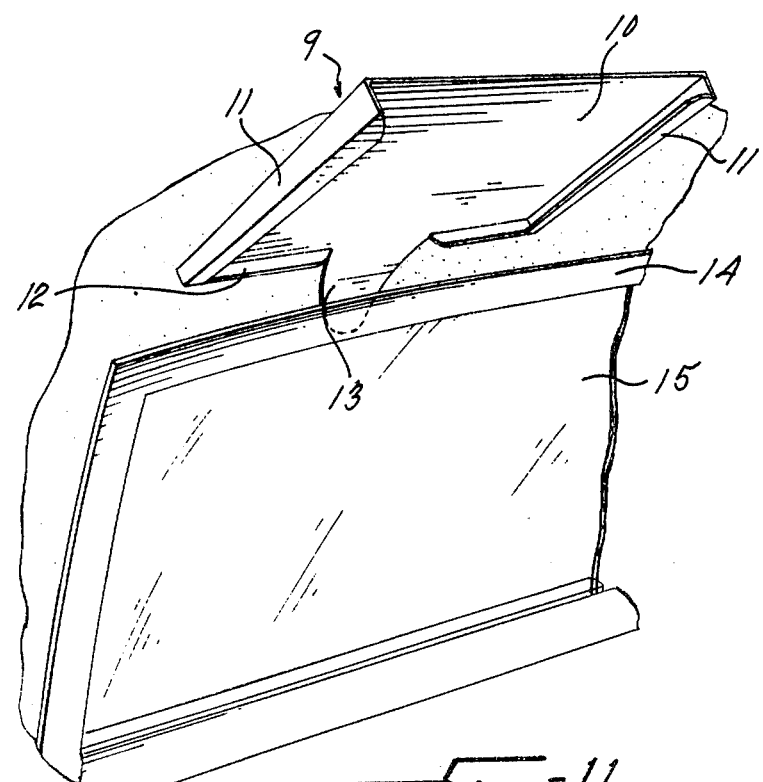
FIG. 11 is a perspective view of a window of a vehicle and a mode of stowing away the vehicle tray.

A tray holder 9 is provided to hold the vehicle tray 1 in stowed position such as shown in FIG. 11. The tray holder 9 includes a back plate portion 10 formed with a pair of laterally opposite flanges 11 which are transversely bent inward to form a slideway adapted to slidably receive the tray from one open end of the holder. The other end of the holder is formed with a stopping edge 12 and with a tab portion 13 which constitutes an edgewise extension of the back plate 10. The holder 9 is adapted to be held in place by insertion of the tab portion 13 in any appropriate slit such as behind the framing trim 14 of an automobile window 15.

The mounting bracket 16 in the first embodiment of the present invention is shown in FIGS. 1, 2, 4, 5 and 6 and is of the "over the dash" type. This "over the dash" mounting bracket 16 is of L-shape configuration defined by an arm operatively extending horizontally and another arm operatively extending vertically. A channel member 17 is bent twice at right angles to form the vertically extending main portion 18 and the rearward projection 19 of the vertically extending arm and to form a forward projection 20 constituting the inner end portion of the horizontally extending arm.

An upstanding connection pin 21 is fixed on the rearward projection 19 and arranged to engage in the upright hole 6 of the tray and to cooperatively form a pin and socket connection to hold the tray 1 in operative position, as shown in FIGS. 2, 4 and 5.

The horizontally extending arm includes a supporting pad 22 slidably mounted in the slide formed by the inner end portion 20 of this arm to be adjusted fore and aft along the latter. The horizontally extending arm also includes an outer or free end portion 23 which is slidably inserted over the free end of the inner portion 20 to be slidably adjustable in the fore and aft direction. This allows for adjustment of the length of the horizontally extending arm in accordance with the fore and aft depth of the dash 24. The free end portion 23 outwardly fans and has a free edge portion 25 which is bent outwardly downward with the same slope as the windshield 26 to upwardly abut against the latter and preferably be bonded thereto by any appropriate type of adhesive or cement.

Thus, the over-the-dash mounting bracket 16 is adjustable to fit different dashes, cars, or trucks to suspend the tray 1 at a convenient height for the driver or front passenger in the vehicle. The tray 1 may be removed and stowed either as shown in FIG. 11 or in some other way such as by merely resting it on the horizontally extending arm of the bracket 16, as shown in FIG. 2.

The mounting bracket 27 in the second embodiment of the present invention is shown in FIGS. 1a, 3, 7, 8 and 9 and is of the on-the-floor type. This floor mounting bracket 27 is also of L-shape configuration defined by an arm operatively extending horizontally and another arm operatively extending vertically.

The horizontally extending arm forms a base to support the vertically extending arm. The horizontally extending arm includes an elongated base member 28 integrally formed with an upright extension 29 at one end. The base member 28 is formed with a groove 30 extending longitudinally in the upper face thereof and forming an enlarged recess 31 at the opposite end relative to the upright extension 29. The base member 28 is secured on the floor 32 of a vehicle by screws 33 engaged downward through the groove 30. The upright extension 29 is formed with a groove 34 upwardly extending in the face thereof in communication with the groove 30 of the base member. This groove 34 is formed with a throat portion to constitute a notch facing in the direction of the groove 30.

The vertically extending arm is made of a wire member 35 which has its lower end portion 36 transversely bent and engaged in the base member 28 at the intersection between the groove 30 and the notch 34. Thus, the wire member 35 is pivoted about this lower bent portion 36 thereof, as indicated by the arrow 37 in FIG. 7, between an upright operative position as shown in FIGS. 3 and 7 and a downward collapsed position in the groove 30 and recess 31, as shown in FIG. 8. In the upright operative position, the wire member 35 pivotally snaps into the notch 34 and is thus held upright.

An upstanding pin 21 is secured on the free outer end of the wire member or rod 35 and projects endwise therefrom to removably carry a vehicle tray 1, as shown in FIG. 3.

A pin or circular boss 21' is provided on the free end portion 23 to retain the tray in the stowed position shown in dotted lines in FIG. 2. A similar pin or boss 21' may be provided elsewhere in the vehicle such as on the shelf behind the back seat to similarly stow the tray.

It will be readily understood that changes in the aforedescribed details of the illustrated embodiments may be made and fall within the spirit and scope of this invention defined by the appended claims.

What I claim is:

1. A vehicle tray and mounting bracket assembly comprising, in combination, a mounting bracket of L-shape configuration including a horizontally extending arm forming an elongated base securable onto the floor of a vehicle and having in the top face a groove extending longitudinally of said base, and a vertically extending arm pivoted to said base, inoperatively collapsible into said groove, a pin operatively projecting upwardly from said vertically extending arm, and a tray having a hole in a front edge portion thereof forming a socket for removably receiving said pin.

2. A vehicle tray and mounting bracket assembly as defined in claim 1, wherein said elongated base includes an upward projection at one end thereof, said upward projection includes in one side thereof a notch facing and aligned with said groove, and said vertically extending arm snappingly engages upright into said notch.

3. A vehicle tray and mounting bracket assembly as defined in claim 2, wherein said vertically extending arm constitutes a wire member having one end portion transversely bent relative to said elongated base and pivotally engaging the latter providing pivotal displacement of the wire member between a collapsed position in said groove and an upright position in said notch.

4. A vehicle tray and mounting bracket assembly as defined in claim 3, wherein said upstanding pin projects endwise from the other end of said wire member.

* * * * *